(12) United States Patent
Swanson et al.

(10) Patent No.: US 10,528,398 B2
(45) Date of Patent: Jan. 7, 2020

(54) OPERATING SYSTEM VISIBILITY INTO SYSTEM STATES THAT CAUSE DELAYS AND TECHNOLOGY TO ACHIEVE DETERMINISTIC LATENCY

(71) Applicant: Intel Corporation, Santa Clara, CA (US)

(72) Inventors: Robert Swanson, Olympia, WA (US); Anil Keshavamurthy, Portland, OR (US); Eswaramoorthi Nallusamy, Cedar Park, TX (US)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 15/721,372

(22) Filed: Sep. 29, 2017

(65) Prior Publication Data

US 2019/0101965 A1   Apr. 4, 2019

(51) Int. Cl.
*G06F 9/50* (2006.01)
*G06F 9/455* (2018.01)
*G06F 9/4401* (2018.01)
*G06F 9/54* (2006.01)

(52) U.S. Cl.
CPC .......... *G06F 9/5083* (2013.01); *G06F 9/4406* (2013.01); *G06F 9/45533* (2013.01); *G06F 9/45558* (2013.01); *G06F 9/505* (2013.01); *G06F 9/54* (2013.01); *G06F 9/4401* (2013.01); *G06F 2009/45595* (2013.01)

(58) Field of Classification Search
CPC ...... G06F 1/24; G06F 9/4406; G06F 9/45558; G06F 9/505; G06F 9/5083; G06F 9/54; G06F 2009/45595; G06F 9/4401; G06F 9/45533
USPC .................................................. 718/102, 105
See application file for complete search history.

(56) References Cited

U.S. PATENT DOCUMENTS

| | | | |
|---|---|---|---|
| 2003/0152084 A1* | 8/2003 | Lee .................. | G06F 9/3885 370/395.21 |
| 2004/0123090 A1* | 6/2004 | Zimmer ............ | G06F 9/4401 713/1 |
| 2011/0055469 A1* | 3/2011 | Natu ................. | G06F 9/461 711/105 |
| 2014/0040543 A1* | 2/2014 | Natu ................. | G06F 9/461 711/105 |
| 2014/0089688 A1* | 3/2014 | Man .................. | G06F 1/3206 713/300 |
| 2017/0010991 A1 | 1/2017 | Natu et al. | |
| 2017/0168844 A1 | 6/2017 | Swanson et al. | |
| 2017/0177873 A1* | 6/2017 | Raghuram ........ | G06F 21/53 |
| 2017/0286157 A1* | 10/2017 | Hasting ............ | G06F 9/505 |

OTHER PUBLICATIONS

"Resources: Open Fog consortium", retrieved from openfogconsortium. org/resources/#idefinition-of-fog-computing, retrieved on Aug. 21, 2017, 11 pages.

* cited by examiner

*Primary Examiner* — Qing Chen
(74) *Attorney, Agent, or Firm* — Jordan IP Law, LLC

(57) ABSTRACT

Systems, apparatuses and methods may provide for technology that detects an initiation of a reset flow in a network edge computing system and determines one or more attributes of one or more long flow instructions during the reset flow, wherein the one or more attributes include a latency of the one or more long flow instructions. Additionally, the one or more attributes may be documented via an interface that is accessible by one or more of an operating system or a hypervisor associated with the network edge computing system.

24 Claims, 6 Drawing Sheets

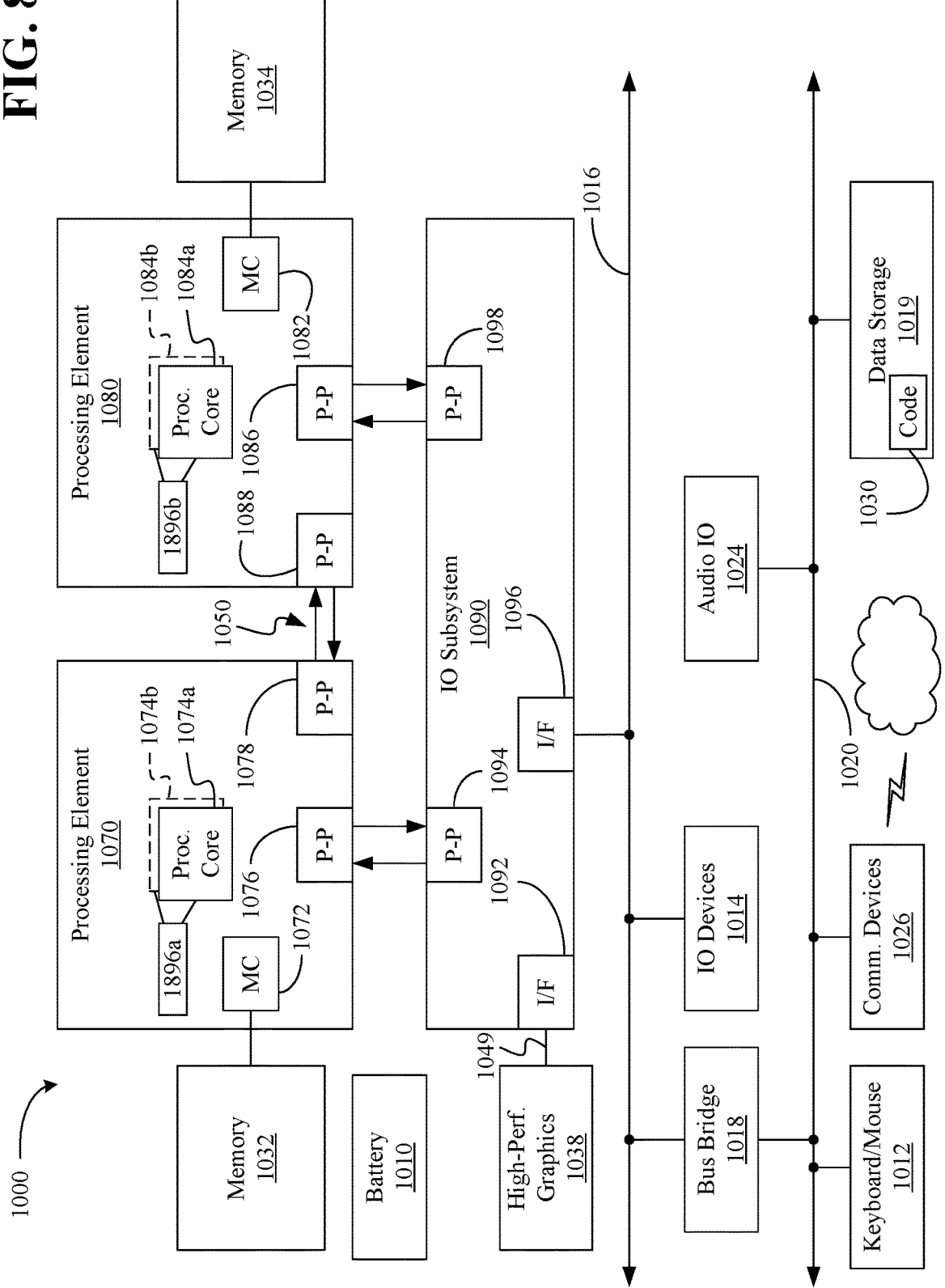

US 10,528,398 B2

OPERATING SYSTEM VISIBILITY INTO SYSTEM STATES THAT CAUSE DELAYS AND TECHNOLOGY TO ACHIEVE DETERMINISTIC LATENCY

TECHNICAL FIELD

Embodiments generally relate to network computing. More particularly, embodiments relate to operating system (OS) visibility into system states that cause delays and technology to achieve deterministic latency.

BACKGROUND

Network edge (e.g., "fog") computing systems may be positioned between cloud computing components and endpoints (e.g., "things") in a wide variety of settings such as, for example, Internet of Things (IoT) architectures, artificial intelligence (AI) architectures, and so forth. While network edge computing systems may provide for computational processing of large quantities of data (e.g., prior to transmission to the cloud), there remains considerable room for improvement. For example, conventional network edge computing systems may completely forego the use of power management functionality and other latency-inducing features to obtain more predictable (e.g., deterministic) compute timing.

BRIEF DESCRIPTION OF THE DRAWINGS

The various advantages of the embodiments will become apparent to one skilled in the art by reading the following specification and appended claims, and by referencing the following drawings, in which:

FIG. 8 is a block diagram of an example of a computing system according to an embodiment.

DESCRIPTION OF EMBODIMENTS

Figure 1:
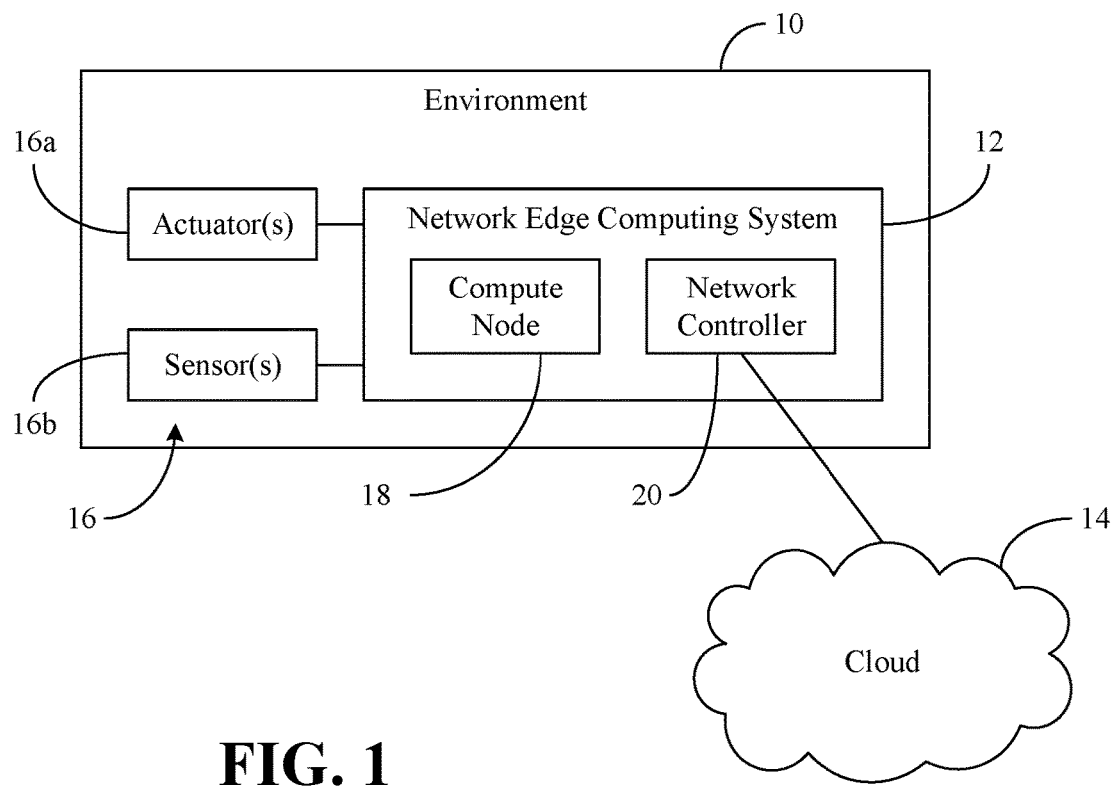
FIG. 1 is a block diagram of an example of an environment containing a network edge computing system according to an embodiment.

Turning now to FIG. 1, an environment 10 is shown in which a network edge (e.g., "fog") computing system 12 is positioned between a cloud computing infrastructure 14 and one or more endpoints 16 (16a, 16b). The network edge computing system 12 may generally include a desktop computer, notebook computer, tablet computer, convertible tablet, personal digital assistant (PDA), mobile Internet device (MID), wearable device, media player, vehicle (e.g., onboard electrical system), gateway, etc., or any combination thereof. In the illustrated example, the endpoints 16 include one or more actuators 16a and one or more sensors 16b, wherein a compute node 18 (e.g., host processor, central processing unit/CPU, embedded controller) of the network edge computing system 12 may process data and/or signals generated by the sensor(s) 16b and control the actuator(s) 16a based on the processing results. The computing system 12 may also include a network controller 20 (e.g., network interface card/NIC, switching fabric) that communicates with the cloud computing infrastructure 14 to achieve higher level processing and/or reporting. The positioning of the compute node 18 within the network edge computing system 12 may enable more deterministic timing/latency, particularly when the amount of data/signals generated by the sensor(s) 16b is relatively large (e.g., big data).

As will be discussed in greater detail, an operating system (OS) and/or hypervisor (e.g., virtual machine monitor/VMM) of the compute node 18 may make runtime decisions as to whether to avoid the execution of instructions that will conflict with performance constraints (e.g., service level agreement/SLA, quality of service/QoS) placed on the computing system 12. Accordingly, the illustrated solution may optimize the balance between deterministic operation and enhanced feature (e.g., power management) operation rather than blindly disabling all power management functionality regardless of the impact on the performance constraints.

Figure 2:
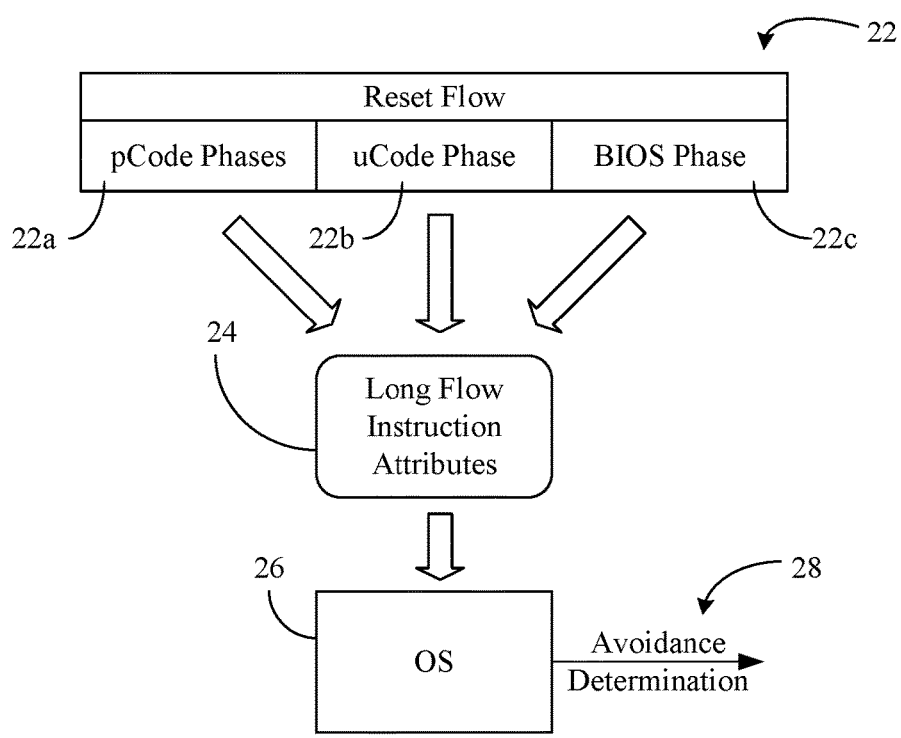
FIG. 2 is an illustration of an example of an operating system (OS) having visibility into system states that cause delays according to an embodiment.

FIG. 2 shows a reset flow 22 (22a-22c) that may be triggered by a reboot and/or power on of a computing system such as, for example, the network edge computing system 12 (FIG. 1), already discussed. In the illustrated example, the reset flow 22 includes a plurality of pCode phases 22a (e.g., Phases 1-5), a microcode/uCode phase 22b (e.g., Phase 6) and a BIOS (basic input output system) phase 22c. The pCode phases 22a may generally occur while a power control unit (PCU) is driving operation of the reset flow 22, the uCode phase 22b may occur when hardware-level code (e.g., implementing higher-level machine code instructions or internal state machine sequencing) is driving operation of the reset flow 22 and the BIOS phase 22c may occur when BIOS and/or unified extensible firmware interface (UEFI) system firmware is driving operation of the reset flow 22.

Attributes 24 of one or more long flow instructions may be identified/determined during the reset flow 22 and communicated to an OS 26 at runtime. The long flow instructions may generally be any instruction having an execution time that exceeds a particular threshold (e.g., configurable, fixed). Moreover, processor cores executing the long flow instructions may be non-responsive to other instructions. Examples of long flow instructions may include, but are not limited to, power state (e.g., memory power state, system power state, low power state) transition instructions, thermal state transition instructions, writeback invalidation instructions, cache flush instructions, microcode load instructions, and so forth. The attributes 24 may include, for example, the latency (e.g., in microseconds), inducement conditions (e.g., instructions or system actions than can induce long flow) and/or stall procedures of the long flow instruction(s).

The interface and/or manner in which the attributes 24 are communicated to the OS 26 may vary depending on the circumstances. For example, information regarding long flow instructions associated with the pCode phases 22a and/or the uCode phase 22b may be written to a register (e.g., control and status register/CSR) that is read by the BIOS/UEFI and/or sent to the BIOS/UEFI in a mailbox command (e.g., BIOS-to-pCode mailbox). The BIOS phase 22c may characterize its portion of the long flow and populate a system management table (e.g., SMBIOS table) with the attributes 24. The illustrated OS 26 may read the system management table and generate a runtime determination 28 of whether to avoid the long flow instruction(s) based on one or more performance constraints (e.g., SLA, QoS) and at least one of the attribute(s) 24. The runtime determination 28 may be to execute the long flow instruction(s), postpone the long flow instruction(s) (e.g., in the case of a writeback invalidation and/or cache flush), or bypass the long flow instruction(s) altogether.

Figure 3:
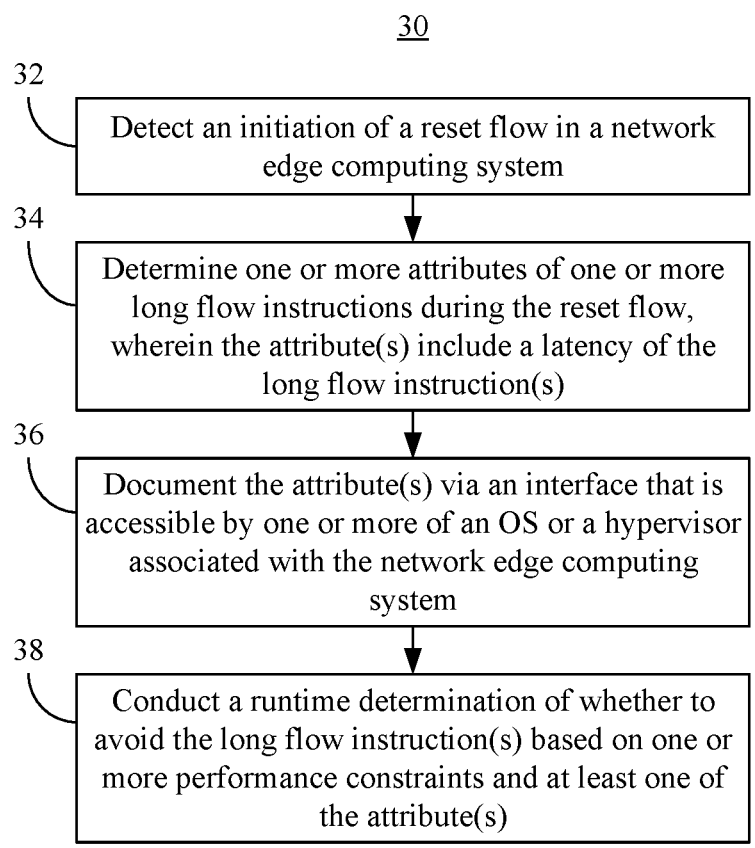
FIG. 3 is a flowchart of an example of a method of conducting a reset flow according to an embodiment.

FIG. 3 shows a method 30 of conducting a reset flow such as, for example, the reset flow 22 (FIG. 2), already discussed. The method 30 may generally be implemented in a computing system such as, for example, the network edge computing system 12 (FIG. 1), already discussed. More particularly, the method 30 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 30 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 32 provides for detecting an initiation of a reset flow in a network edge computing system. The initiation may be triggered by a reboot and/or power on request (e.g., hardware and/or software based). Block 34 may determine one or more attributes of one or more long flow instructions during the reset flow, wherein the attribute(s) include a latency of the long flow instruction(s). The attribute(s) may also include inducement conditions, stall procedures, etc., associated with the long flow instruction(s). In one example, processor cores executing the long flow instruction(s) are non-responsive to other instructions. The long flow instruction(s) may also have an execution time that exceeds a particular threshold (e.g., configurable, fixed).

The attribute(s) may be documented at block 36 via an interface that is accessible by one or more of an OS or a hypervisor associated with the network edge computing system. As already noted, the attribute(s) may be documented during a pCode phase, a microcode phase and/or a BIOS phase of the reset flow. Additionally, block 36 may include writing at least one of the attribute(s) to a register such as, for example, a CSR. Block 36 may also include communicating at least one of the attribute(s) in a mailbox command. In yet another example, block 36 includes populating a system management table with at least one of the attribute(s). The system management table may be accessible by the OS, as well as other management entities (e.g., management engine/ME, innovation engine/IE, baseboard management controller/BMC) involved in triggering long flow instructions. Other interfaces such as, for example, a keyboard controller style (KCS) interface, mailbox buffers, a host embedded controller interface (HECI) 1/2/3, etc., may also by used by the BIOS/UEFI to communicate with the management entities. Illustrated block 38 conducts a runtime determination of whether to avoid the long flow instruction(s) based on one or more performance constraints and at least one of the attribute(s). The performance constraints may include, for example, an SLA and/or QoS requirement (e.g., specifying maximum delay).

Thus, the illustrated method 30 might selectively activate hardware performance state (P-state) transitions, provided that such transitions would not result in unacceptable latencies from an SLA or QoS standpoint. Other advanced functionality such as "turbo" operation, thermal state (T-state) transitions, low power state (e.g., Advanced Configuration and Power Interface/ACPI C6/C7 state) entry, writeback invalidations, cache flushes, and so forth, may also be selectively enabled at runtime. As a result, the illustrated method 30 significantly reduces power consumption of the network edge computing system while maintaining high performance levels.

Figure 4:
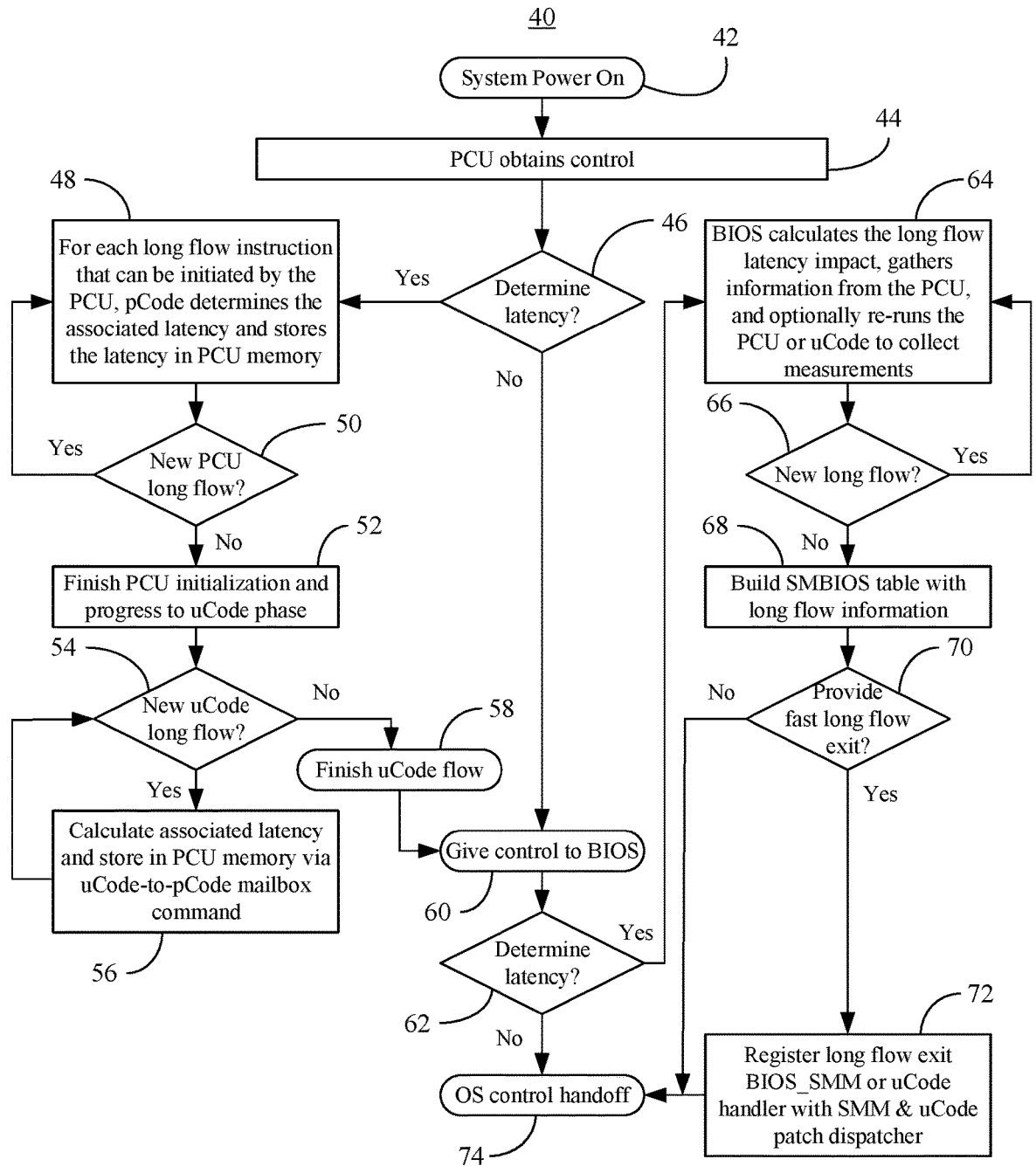
FIG. 4 is a flowchart of an example of a method of documenting attributes of long flow instructions according to an embodiment.

FIG. 4 shows a method 40 of documenting attributes of long flow instructions. The method 40 may generally be implemented in a computing system such as, for example, the network edge computing system 12 (FIG. 1), already discussed. More particularly, the method 40 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 42 detects a system power on event, wherein a power control unit (PCU) obtains control at processing block 44. Block 46 determines whether pCode latency determinations are enabled. If so, for each long flow instruction that can be enabled by the PCU, block 48 uses pCode to determine the associated latency and store the latency in PCU memory. Illustrated block 50 determines whether there are any remaining PCU long flow instructions. If so, the illustrated method 40 repeats block 48. Once the last PCU long flow instruction has been documented, block 52 finishes PCU initialization and progresses to the microcode phase (e.g., giving control to the uCode in Phase 6 of the reset flow).

Block 54 may determine whether there are any remaining uCode long flow instructions. If so, illustrated block 56 calculates the associated latency and stores the latency in PCU memory via a uCode-to-pCode mailbox command. Once the last uCode long flow instruction is documented, illustrated block 58 finishes the microcode flow and block 60 may give control to the BIOS (e.g., in Phase 7 of the reset flow). A determination may be made at block 62 as to whether BIOS latency determinations are enabled. If so, illustrated block 64 may use BIOS to calculate the latency impact, gather information from the PCU and optionally re-run the PCU or microcode to collect measurements. Block 66 determines whether there are any remaining BIOS long flow instructions. If so, the method 40 may repeat block 64. Once all long flow measurements have been gathered, block 68 may build a SMBIOS table with the long flow information. Block 68 may include using a BIOS SMM (system management mode) handler to dynamically update the SMBIOS table with an indicator of the reason for the long flow. SMM is one example of a special purpose operating mode that is used to handle system-wide functions such as power management, system hardware control, or proprietary original equipment manufacturer (OEM)-designated code. SMM may be considered as a "hidden" operating mode because the OS and OS-executed software cannot see it or access it.

Illustrated block 70 determines whether "fast" long flow exits are enabled. If so, a long flow exit may be registered at block 72. Block 72 may register the fast long flow exit as an SMM condition (e.g., BIOS SMM), register the fast long flow exit as a uCode handler with a uCode patch dispatcher, and so forth. Thus, the registration may conducted in a number of ways. In general, if a long flow may be exited, an application programming interface (API) callback may be enabled by the OS during a particular time window (e.g., SLA/QoS required time window), so that the OS may be told via SMBIOS that a long flow exit exists. In one example, an ACPI process might enable or disable the long flow exit, wherein system software (e.g., BIOS, pCode, uCode) describes the long flow with the BIOS providing the final measurement and determining whether it can provide a long flow exit. In such a case, the OS may enable "auto-exit" during the SLA time window and disable the auto-exit after the SLA time window. Other approaches may also be used to register the fast long flow exit. Illustrated block 74 hands off control to the OS. If it is determined at block 46 that pCode latency determinations are not enabled, the illustrated method 40 proceeds directly to block 60. Additionally, if it is determined at block 62 that BIOS latency determinations are not enabled, the illustrated method 40 proceeds directly to block 64.

Figure 5:
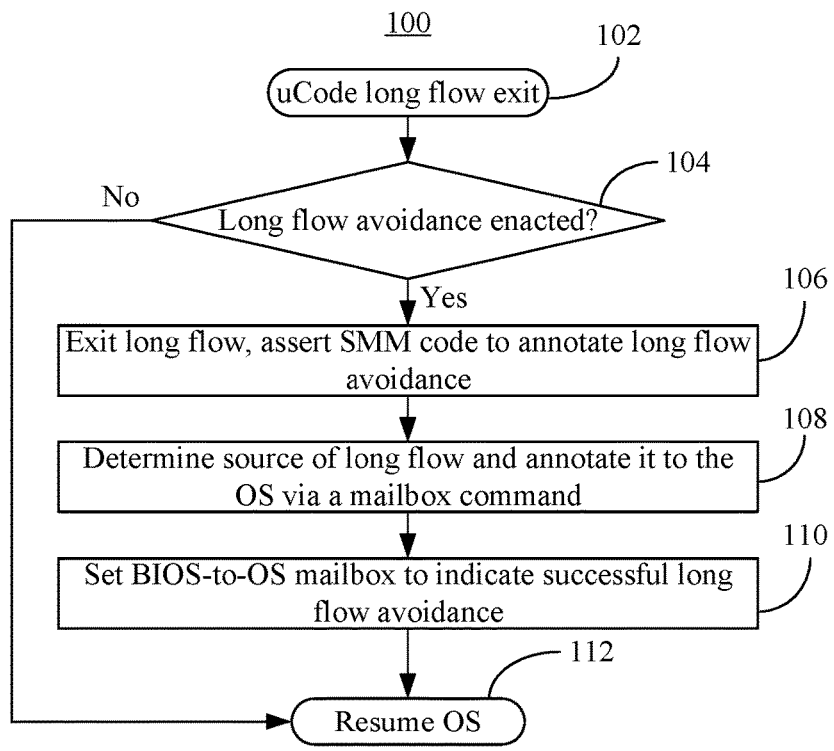
FIG. 5 is a flowchart of an example of a method of conducting long flow avoidance according to an embodiment.

FIG. 5 shows a method 100 of conducting long flow avoidance. The method 100 may generally be implemented in a computing system such as, for example, the network edge computing system 12 (FIG. 1), already discussed. More particularly, the method 100 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 102 detects a uCode long flow exit, wherein a determination may be made at block 104 as to whether long flow avoidance has been enacted (e.g., by the OS). If so, block 106 may exit the long flow and assert a SMM code to annotate the long flow avoidance. Additionally, the source of the long flow instruction may be determined and annotated to the OS at block 108 via a mailbox command. Block 108 may therefore enable the system to learn and adapt to system-specific conditions that may lead to long flow avoidance. Block 110 may set a BIOS-to-OS mailbox to indicate that long flow avoidance was successful, wherein the illustrated block 112 resumes OS control. If it is determined at block 104 that long flow avoidance is not enacted, the illustrated method proceeds directly to block 112.

Figure 6:
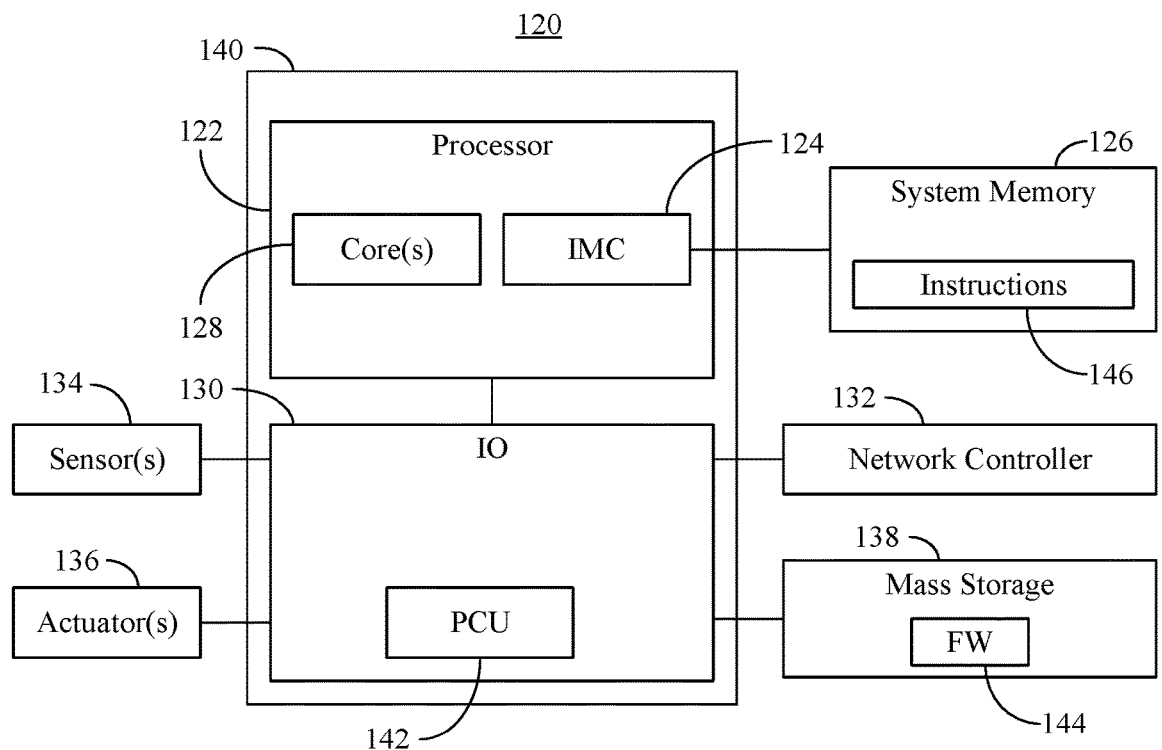
FIG. 6 is a block diagram of an example of a network edge computing system according to an embodiment.

FIG. 6 shows a network edge computing system 120 that may be readily substituted for the network edge computing system 12 (FIG. 1), already discussed. The illustrated system 120 includes a processor 122 (e.g., host processor, central processing unit/CPU) that generally executes an OS and/or hypervisor (e.g., VMM). In this regard, the processor 122 may support the concurrent execution of multiple virtual machines (VMs), each having an independent OS instance. In one example, the processor 122 has one or more cores 128 and an integrated memory controller (IMC) 124 coupled to a system memory 126 (e.g., volatile memory, dynamic random access memory/DRAM). The processor 122 may also be coupled to an input/output (IO) module 130 that communicates with a network controller 132 (e.g., network interface circuitry, NIC), one or more sensors 134 (e.g., temperature, pressure, humidity, velocity), one or more actuators 136 (e.g., solenoids, valves, switches) and mass storage 138 (non-volatile memory/NVM, hard disk drive/HDD, optical disk, solid state drive/SSD, flash memory). The processor 122 and the IO module 130 may be incorporated into a shared die 140 as a system on chip (SoC).

The reset flow of the system 120 may generally involve a power control unit (PCU) 142 of the IO module 130 executing pCode during a number of phases (e.g., Phases 1-5), the processor cores 128 executing microcode during a subsequent phase (e.g., Phase 6), and then the IO module 130 executing system firmware (FW, e.g., BIOS, UEFI) 144 retrieved from the mass storage 138 during another phase (e.g., Phase 7). The illustrated system memory 126 includes instructions, which when executed by the processor 122 and/or the IO module 130, cause the network edge computing system 120 to conduct one or more aspects of the method 30 (FIG. 3), the method 40 (FIG. 4) and/or the method 100 (FIG. 5), already discussed. Accordingly, execution of the instructions 146 may cause the computing system 120 to detect an initiation of the reset flow in the network edge computing system 120 and determine one or more attributes of one or more long flow instructions during the reset flow, wherein the attribute(s) include a latency of the long flow instruction(s). Additionally, execution of the instructions 146 may cause the computing system 120 to document the attributes via an interface that is accessible by the OS and/or the hypervisor. The interface may include, for example, a register, mailbox command, system management table, KCS interface, HECI, etc., or any combination thereof.

The instructions 146 may also be embodied in a semiconductor package apparatus (e.g., chip) that includes a substrate (e.g., silicon, sapphire, gallium arsenide) and logic (e.g., transistor array and other integrated circuit/IC components) coupled to the substrate. The logic, which may be implemented in configurable logic and/or fixed-functionality logic hardware, may generally implement one or more aspects of the method 30 (FIG. 3), the method 40 (FIG. 4) and/or the method 100 (FIG. 5), already discussed.

Figure 7:
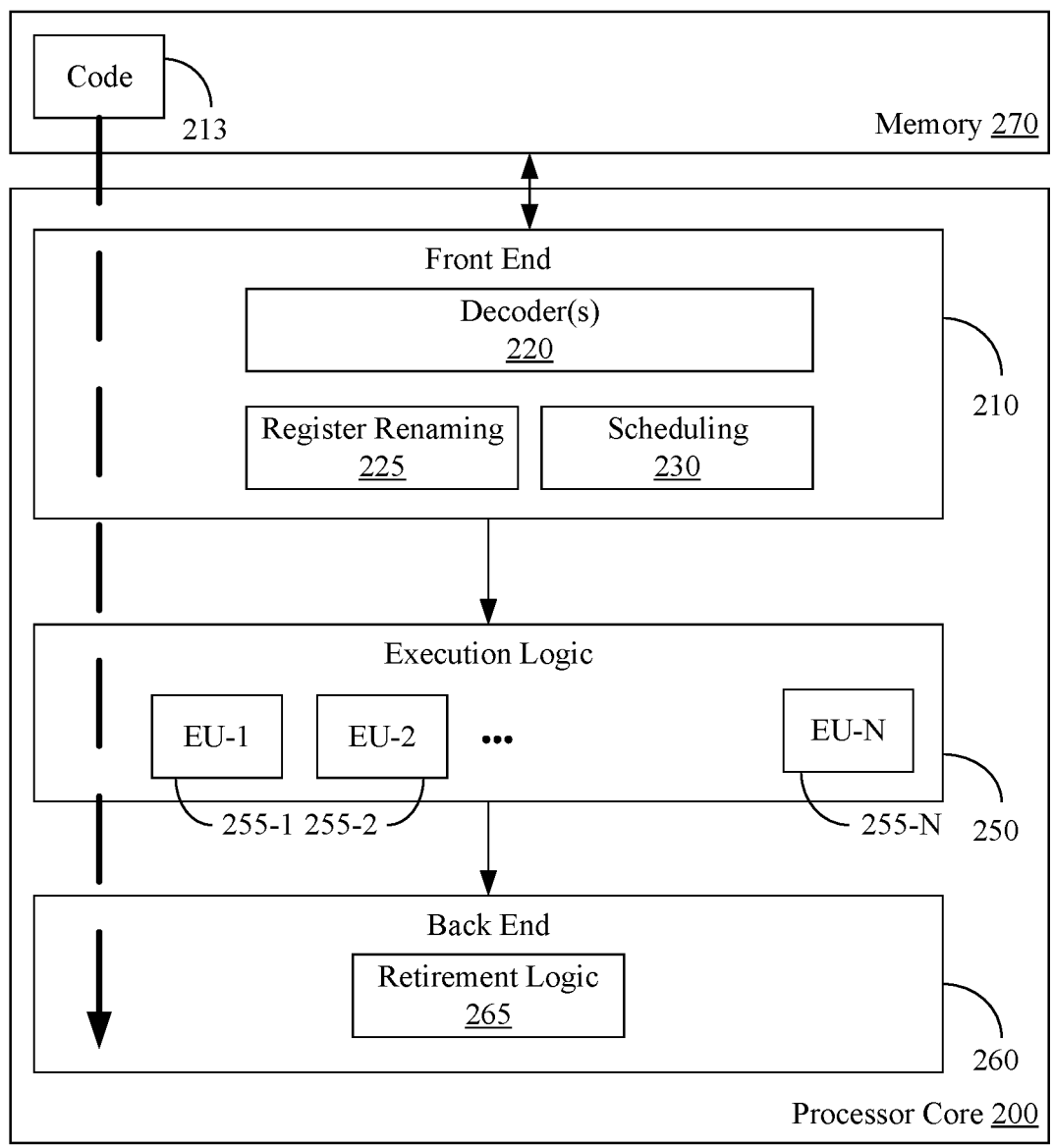
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 30

(FIG. 3), the method 40 (FIG. 4) and/or the method 100 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 30 (FIG. 3), the method 40 (FIG. 4) and/or the method 100 (FIG. 5), already discussed, and may be similar to the code 213 (FIG. 7), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

ADDITIONAL NOTES AND EXAMPLES

Example 1 may include a network edge computing system comprising a network controller, one or more processors coupled to the network controller, the one or more processors to execute one or more of an operating system or a hypervisor, a memory coupled to the one or more processors, the memory including a set of instructions, which when executed by a processor, cause the computing system to detect an initiation of a reset flow in the computing system, determine one or more attributes of one or more long flow instructions during the reset flow, wherein the one or more attributes include a latency of the one or more long flow instructions, and document the one or more attributes via an interface that is accessible by one or more of the operating system or the hypervisor.

Example 2 may include the computing system of Example 1, wherein the one or more attributes are to be documented during one or more of a pCode phase, a microcode phase or a basic input output system (BIOS) phase of the reset flow.

Example 3 may include the computing system of Example 1, wherein the one or more processors further include a register and wherein the instructions, when executed, cause the computing system to write at least one of the one or more attributes to the register.

Example 4 may include the computing system of Example 1, wherein the instructions, when executed, cause the computing system to communicate at least one of the one or more attributes in a mailbox command.

Example 5 may include the computing system of Example 1, wherein the instructions, when executed, cause the computing system to populate a system management table with at least one of the one or more attributes.

Example 6 may include the computing system of Example 1, wherein the one or more attributes are to further include one or more of inducement conditions or stall procedures associated with the long flow instructions.

Example 7 may include the computing system of Example 1, wherein cores of the one or more processors executing the one or more long instructions are to be non-responsive to other instructions.

Example 8 may include the computing system of any one of Examples 1 to 7, wherein the instructions, when executed, cause the computing system to conduct a runtime determination of whether to avoid the one or more long flow instructions based on one or more performance constraints and at least one of the one or more attributes.

Example 9 may include at least one computer readable storage medium comprising a set of instructions, which when executed by a network edge computing system, cause the computing system to detect an initiation of a reset flow in a network edge computing system, determine one or more attributes of one or more long flow instructions during the reset flow, wherein the one or more attributes include a latency of the one or more long flow instructions, and document the one or more attributes via an interface that is accessible by one or more of an operating system or a hypervisor associated with the network edge computing system.

Example 10 may include the at least one computer readable storage medium of Example 9, wherein the one or more attributes are to be documented during one or more of a pCode phase, a microcode phase or a basic input output system (BIOS) phase of the reset flow.

Example 11 may include the at least one computer readable storage medium of Example 9, wherein the instructions, when executed, cause the computing system to write at least one of the one or more attributes to a register.

Example 12 may include the at least one computer readable storage medium of Example 9, wherein the instructions, when executed, cause the computing system to communicate at least one of the one or more attributes in a mailbox command.

Example 13 may include the at least one computer readable storage medium of Example 9, wherein the instructions, when executed, cause the computing system to populate a system management table with at least one of the one or more attributes.

Example 14 may include the at least one computer readable storage medium of Example 9, wherein the one or more attributes are to further include one or more of inducement conditions or stall procedures associated with the long flow instructions.

Example 15 may include the at least one computer readable storage medium of Example 9, wherein processor cores executing the one or more long instructions are to be non-responsive to other instructions.

Example 16 may include the at least one computer readable storage medium of any one of Examples 9 to 15, wherein the instructions, when executed, cause the computing system to conduct a runtime determination of whether to avoid the one or more long flow instructions based on one or more performance constraints and at least one of the one or more attributes.

Example 17 may include a method of conducting reset flows, comprising detecting an initiation of a reset flow in a network edge computing system, determining one or more attributes of one or more long flow instructions during the reset flow, wherein the one or more attributes include a latency of the one or more long flow instructions, and documenting the one or more attributes via an interface that is accessible by one or more of an operating system or a hypervisor associated with the network edge computing system.

Example 18 may include the method of Example 17, wherein the one or more attributes are documented during one or more of a pCode phase, a microcode phase or a basic input output system (BIOS) phase of the reset flow.

Example 19 may include the method of Example 17, wherein documenting the one or more attributes includes writing at least one of the one or more attributes to a register.

Example 20 may include the method of Example 17, wherein documenting the one or more attributes includes communicating at least one of the one or more attributes in a mailbox command.

Example 21 may include the method of Example 17, wherein documenting the one or more attributes includes populating a system management table with at least one of the one or more attributes.

Example 22 may include the method of Example 17, wherein the one or more attributes further include one or more of inducement conditions or stall procedures associated with the one or more long flow instructions.

Example 23 may include the method of Example 17, wherein processor cores executing the one or more long flow instructions are non-responsive to other instructions.

Example 24 may include the method of any one of Examples 17 to 23, further including conducting a runtime determination of whether to avoid the one or more long flow instructions based on one or more performance constraints and at least one of the one or more attributes.

Example 25 may include a network edge computing system comprising means for detecting an initiation of a reset flow in a network edge computing system, means for determining one or more attributes of one or more long flow instructions during the reset flow, wherein the one or more attributes include a latency of the one or more long flow instructions, and means for documenting the one or more attributes via an interface that is accessible by one or more of an operating system or a hypervisor associated with the network edge computing system.

Example 26 may include the computing system of Example 25, wherein the one or more attributes are to be documented during one or more of a pCode phase, a microcode phase or a basic input output system (BIOS) phase of the reset flow.

Example 27 may include the computing system of Example 25, wherein the means for documenting the one or more attributes includes means for writing at least one of the one or more attributes to a register.

Example 28 may include the computing system of Example 25, wherein the means for documenting the one or more attributes includes means for communicating at least one of the one or more attributes in a mailbox command.

Example 29 may include the computing system of Example 25, wherein the means for documenting the one or more attributes includes means for populating a system management table with at least one of the one or more attributes.

Example 30 may include the computing system of Example 25, wherein the one or more attributes further include one or more of inducement conditions or stall procedures associated with the one or more long flow instructions.

Example 31 may include the computing system of Example 25, wherein processor cores executing the one or more long flow instructions are to be non-responsive to other instructions.

Example 32 may include the computing system of any one of Examples 25 to 31, further including means for conducting a runtime determination of whether to avoid the one or more long flow instructions based on one or more performance constraints and at least one of the one or more attributes.

Thus, technology described herein may determine all micro-architectural latency inducing transitions, describe them to the OS and in some cases prevent them from occurring to ensure that overall SLA or QoS guarantees setup by the OS are not violated. Accordingly, a latency application programming interface (API) may be established between the management/orchestration domain and the host computing domain. Moreover, high performance fog computing solutions may be rendered more deterministic.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A network edge computing system comprising:
a network controller;
one or more processors coupled to the network controller, the one or more processors to execute one or more of an operating system or a hypervisor; and
a memory coupled to the one or more processors, the memory storing a set of instructions, which when executed by the one or more processors, cause the
network edge computing system to:
detect an initiation of a reset flow in the network edge
computing system;
determine one or more attributes of one or more long flow
instructions during the reset flow, wherein the one or
more attributes of the one or more long flow instructions are to include a latency of the one or more long
flow instructions, and wherein the one or more attributes of the one or more long flow instructions are to
further include one or more of inducement conditions
or stall procedures associated with the one or more long
flow instructions;
document the one or more attributes of the one or more
long flow instructions via an interface that is accessible
by one or more of the operating system or the hypervisor; and
execute a runtime determination of whether to avoid the
one or more long flow instructions or to execute the one
or more long flow instructions based on at least one of
the one or more attributes of the one or more long flow
instructions, wherein the at least one of the one or more
attributes of the one or more long flow instructions is to
include the latency of the one or more long flow
instructions.

2. The network edge computing system of claim 1, wherein the one or more attributes of the one or more long flow instructions are documented during one or more of a pCode phase, a microcode phase, or a basic input output system (BIOS) phase of the reset flow.

3. The network edge computing system of claim 1, wherein the one or more processors further include a register, and wherein the set of instructions, which when executed by the one or more processors, cause the network edge computing system to write at least one of the one or more attributes of the one or more long flow instructions to the register.

4. The network edge computing system of claim 1, wherein the set of instructions, which when executed by the one or more processors, cause the network edge computing system to communicate at least one of the one or more attributes of the one or more long flow instructions in a mailbox command.

5. The network edge computing system of claim 1, wherein the set of instructions, which when executed by the one or more processors, cause the network edge computing system to populate a system management table with at least one of the one or more attributes of the one or more long flow instructions.

6. The network edge computing system of claim 1, wherein the one or more attributes of the one or more long flow instructions are to further include one or more of the inducement conditions and the stall procedures associated with the one or more long flow instructions.

7. The network edge computing system of claim 1, wherein cores of the one or more processors executing the one or more long flow instructions are non-responsive to other instructions.

8. The network edge computing system of claim 1, wherein the set of instructions, which when executed by the one or more processors, cause the network edge computing system to execute a runtime determination of whether to avoid the one or more long flow instructions based on one or more performance constraints and the at least one of the one or more attributes of the one or more long flow instructions.

9. At least one non-transitory computer readable storage medium storing a set of instructions, which when executed by a network edge computing system, cause the network edge computing system to:
detect an initiation of a reset flow in the network edge computing system;
determine one or more attributes of one or more long flow instructions during the reset flow, wherein the one or more attributes of the one or more long flow instructions are to include a latency of the one or more long flow instructions, and wherein the one or more attributes of the one or more long flow instructions are to further include one or more of inducement conditions or stall procedures associated with the one or more long flow instructions;
document the one or more attributes of the one or more long flow instructions via an interface that is accessible by one or more of an operating system or a hypervisor associated with the network edge computing system; and
execute a runtime determination of whether to avoid the one or more long flow instructions or to execute the one or more long flow instructions based on at least one of the one or more attributes of the one or more long flow instructions, wherein the at least one of the one or more attributes of the one or more long flow instructions is to include the latency of the one or more long flow instructions.

10. The at least one non-transitory computer readable storage medium of claim 9, wherein the one or more attributes of the one or more long flow instructions are documented during one or more of a pCode phase, a microcode phase, or a basic input output system (BIOS) phase of the reset flow.

11. The at least one non-transitory computer readable storage medium of claim 9, wherein the set of instructions, which when executed by the network edge computing system, cause the network edge computing system to write at least one of the one or more attributes of the one or more long flow instructions to a register.

12. The at least one non-transitory computer readable storage medium of claim 9, wherein the set of instructions, which when executed by the network edge computing system, cause the network edge computing system to communicate at least one of the one or more attributes of the one or more long flow instructions in a mailbox command.

13. The at least one non-transitory computer readable storage medium of claim 9, wherein the set of instructions, which when executed by the network edge computing system, cause the network edge computing system to populate a system management table with at least one of the one or more attributes of the one or more long flow instructions.

14. The at least one non-transitory computer readable storage medium of claim 9, wherein the one or more attributes of the one or more long flow instructions are to further include one or more of the inducement conditions and the stall procedures associated with the one or more long flow instructions.

15. The at least one non-transitory computer readable storage medium of claim 9, wherein processor cores executing the one or more long flow instructions are non-responsive to other instructions.

16. The at least one non-transitory computer readable storage medium of claim 9, wherein the set of instructions, which when executed by the network edge computing system, cause the network edge computing system to execute a runtime determination of whether to avoid the one or more long flow instructions based on one or more performance constraints and the at least one of the one or more attributes of the one or more long flow instructions.

17. A method comprising:
- detecting an initiation of a reset flow in a network edge computing system;
- determining one or more attributes of one or more long flow instructions during the reset flow, wherein the one or more attributes of the one or more long flow instructions are to include a latency of the one or more long flow instructions, and wherein the one or more attributes of the one or more long flow instructions are to further include one or more of inducement conditions or stall procedures associated with the one or more long flow instructions;
- documenting the one or more attributes of the one or more long flow instructions via an interface that is accessible by one or more of an operating system or a hypervisor associated with the network edge computing system; and
- executing a runtime determination of whether to avoid the one or more long flow instructions or to execute the one or more long flow instructions based on at least one of the one or more attributes of the one or more long flow instructions, wherein the at least one of the one or more attributes of the one or more long flow instructions is to include the latency of the one or more long flow instructions.

18. The method of claim 17, wherein the one or more attributes of the one or more long flow instructions are documented during one or more of a pCode phase, a microcode phase, or a basic input output system (BIOS) phase of the reset flow.

19. The method of claim 17, wherein documenting the one or more attributes of the one or more long flow instructions includes writing at least one of the one or more attributes of the one or more long flow instructions to a register.

20. The method of claim 17, wherein documenting the one or more attributes of the one or more long flow instructions includes communicating at least one of the one or more attributes of the one or more long flow instructions in a mailbox command.

21. The method of claim 17, wherein documenting the one or more attributes of the one or more long flow instructions includes populating a system management table with at least one of the one or more attributes of the one or more long flow instructions.

22. The method of claim 17, wherein the one or more attributes of the one or more long flow instructions are to further include one or more of the inducement conditions and the stall procedures associated with the one or more long flow instructions.

23. The method of claim 17, wherein processor cores executing the one or more long flow instructions are non-responsive to other instructions.

24. The method of claim 17, further including executing a runtime determination of whether to avoid the one or more long flow instructions based on one or more performance constraints and the at least one of the one or more attributes of the one or more long flow instructions.

* * * * *